US008018851B1

(12) United States Patent
Medina et al.

(10) Patent No.: US 8,018,851 B1
(45) Date of Patent: Sep. 13, 2011

(54) FLOW CONTROL FOR MULTIPORT PHY

(75) Inventors: Eitan Medina, Ramat Hasharon (IL); Yaniv Kopelman, Raanana (IL)

(73) Assignee: Marvell Israel (MISL) Ltd., Yokneam (IL)

( * ) Notice: Subject to any disclaimer, the term of this patent is extended or adjusted under 35 U.S.C. 154(b) by 1182 days.

(21) Appl. No.: 10/883,480

(22) Filed: Jun. 30, 2004

(51) Int. Cl.
*H04L 12/26* (2006.01)

(52) U.S. Cl. .................................................. 370/235

(58) Field of Classification Search .................. None
See application file for complete search history.

(56) References Cited

U.S. PATENT DOCUMENTS

| | | | | |
|---|---|---|---|---|
| 5,493,566 A * | 2/1996 | Ljungberg et al. | ............ | 370/231 |
| 5,539,747 A * | 7/1996 | Ito et al. | ............ | 370/235 |
| 5,905,870 A * | 5/1999 | Mangin et al. | ............ | 709/234 |
| 6,026,075 A * | 2/2000 | Linville et al. | ............ | 370/236 |
| 6,094,436 A | 7/2000 | Runaldue et al. | | |
| 6,115,356 A * | 9/2000 | Kalkunte et al. | ............ | 370/229 |
| 6,167,029 A * | 12/2000 | Ramakrishnan | ............ | 370/235 |
| 6,389,112 B1 | 5/2002 | Stewart et al. | | |
| 6,405,258 B1 * | 6/2002 | Erimli et al. | ............ | 370/235 |
| 6,553,027 B1 | 4/2003 | Lam et al. | | |
| 6,628,613 B1 * | 9/2003 | Joung et al. | ............ | 370/230 |
| 6,636,480 B1 | 10/2003 | Walia et al. | | |
| 6,636,510 B1 * | 10/2003 | Lee et al. | ............ | 370/390 |
| 6,859,435 B1 * | 2/2005 | Lee et al. | ............ | 370/231 |
| 6,965,565 B1 * | 11/2005 | Duclos | ............ | 370/235 |
| 6,999,415 B2 * | 2/2006 | Luijten et al. | ............ | 370/230 |
| 7,031,302 B1 * | 4/2006 | Malalur | ............ | 370/357 |
| 7,158,480 B1 * | 1/2007 | Firoiu et al. | ............ | 370/235 |
| 7,180,857 B2 * | 2/2007 | Kawakami et al. | ............ | 370/231 |
| 7,190,667 B2 * | 3/2007 | Susnow et al. | ............ | 370/229 |
| 7,848,341 B2 * | 12/2010 | Benner et al. | ............ | 370/412 |
| 2002/0136163 A1 * | 9/2002 | Kawakami et al. | ............ | 370/229 |
| 2003/0016628 A1 * | 1/2003 | Kadambi et al. | ............ | 370/235 |
| 2003/0227926 A1 | 12/2003 | Ramamurthy et al. | | |
| 2004/0085904 A1 * | 5/2004 | Bordogna et al. | ............ | 370/236 |
| 2004/0160919 A1 * | 8/2004 | Balachandran et al. | ...... | 370/335 |
| 2004/0213151 A1 * | 10/2004 | Willhite et al. | ............ | 370/229 |
| 2005/0108444 A1 * | 5/2005 | Flauaus et al. | ............ | 710/15 |
| 2005/0144314 A1 * | 6/2005 | Kan et al. | ............ | 709/238 |
| 2007/0091799 A1 * | 4/2007 | Wiemann et al. | ............ | 370/230 |
| 2008/0291832 A1 * | 11/2008 | Bordogna et al. | ............ | 370/236 |
| 2009/0141627 A1 * | 6/2009 | Gonzalez et al. | ............ | 370/230 |

FOREIGN PATENT DOCUMENTS

EP 0962077 B1 6/2000

OTHER PUBLICATIONS

"Central Processing Unit," *Wikipedia* [retrieved from the Internet on Apr. 26, 2010], available at http://en.wikipedia.org/wiki/Central_Processing_Unit (see section "Operation"), 12 pages.

(Continued)

*Primary Examiner* — Anh-Vu Ly

(57) ABSTRACT

A network system may include a number of switches connected to a network processor that handles the bulk of the switching and/or routing in the system. The switches may provide per port flow control status information, e.g., the flow control status of a number of their ports, over a link to the network processor. The network processor may use this information to make traffic management decisions.

51 Claims, 4 Drawing Sheets

OTHER PUBLICATIONS

IEEE Standards 802.1D, Media Access Control (MAC) Bridges, 281 pages (2004).

IEEE Standards 802.3, 810 pages (2005).

Kohler, "Network Processor Overview," *Netrino* [retrieved from the Internet on Apr. 26, 2010], available at http:/www.netrino.com/Embedded-Systems/How-To/Network-Processors (*see* "Network Processor Overview"), 11 pages.

Memik and Mangione-Smith, "Evaluating Network Processors using Netbench," *ACM Transactions on Embedded Computing Systems*, vol. 5, Issue 2 (May 2006) [retrieved from the Internet on Apr. 26, 2010], available at http://citeseerx.ist.psu.edu/viewdoc/download?doi=10.1.1.12.2816&rep=rep1&type=pdf (*see* "Introduction", $2^{nd}$ paragraph), 15 pages.

"Network Processor," *Electronics Information* [retrieved from the Internet on Apr. 26, 2010], available at http://www.electronics-manufacturers.com/info/circuits-and-processors/network-processor.html (*see* $1^{st}$, $2^{nd}$ and last paragraphs), 4 pages.

* cited by examiner

FLOW CONTROL FOR MULTIPORT PHY

BACKGROUND

Flow control is a technique for preventing packet losses in a switched environment due to network bottlenecks or congestion. Ideally, a high performance switch should be capable of forwarding frames at full wire speed to and from each of its ports simultaneously with almost no latency and no packet loss. However, in practice, situations may arise when packet data is transmitted faster than it can be handled by the switch.

Switches may include buffers at each port (e.g., first-in-first-out (FIFO) registers) to alleviate some inconsistencies between port-to-port transmit and receive rates with link partners. However, if the buffer at the destination port of an incoming packet is full, a conventional switch may be forced to drop the packet.

The IEEE 802.3x standard specifies a flow control mechanism for Ethernet LAN (Local Area Network) switches. The IEEE 802.3x flow control mechanism is implemented within the MAC (Media Access Control) sublayer. A port's input buffer begins, to fill as packets are received. Once the buffer has reached a pre-programmed threshold, the MAC control sublayer signals an internal state machine to transmit a "PAUSE" frame. The PAUSE frame informs the link partner to halt transmission for a specified length of time, e.g., a programmed idle time. The MAC control module continues to transmit PAUSE frames with the programmed idle time as long as the threshold has been exceeded. If the buffer level falls below the threshold prior to the expiration of this time, another PAUSE frame is sent with a zero time specified to re-enable transmission.

SUMMARY

A network system may include a number of switches connected to a network processor that handles the bulk of the switching and/or routing in the system. The switches may provide per port flow control status information, e.g., the flow control status of a number of their ports, over a link to the network processor. The network processor may use this information to make traffic management decisions.

A switch may include a flow control monitor to monitor a flow control status of a number of ports in the switch, and a flow control module to generate an indicator identifying the flow control status of the ports. The indicator be incorporated into a frame having a format similar to an IEEE 802.3x PAUSE frame. The indicator may be a bitmap incorporated into, e.g., the reserved field or preamble field in the frame. The flow control monitor may generate the indicator in response to the flow control monitor detecting a flow control event at one of the ports, e.g., a port's output queue reaching a flow control threshold. The switch may send the PAUSE frame to a link partner, e.g., a network processor, via one of its ports.

DETAILED DESCRIPTION

Figure 1:
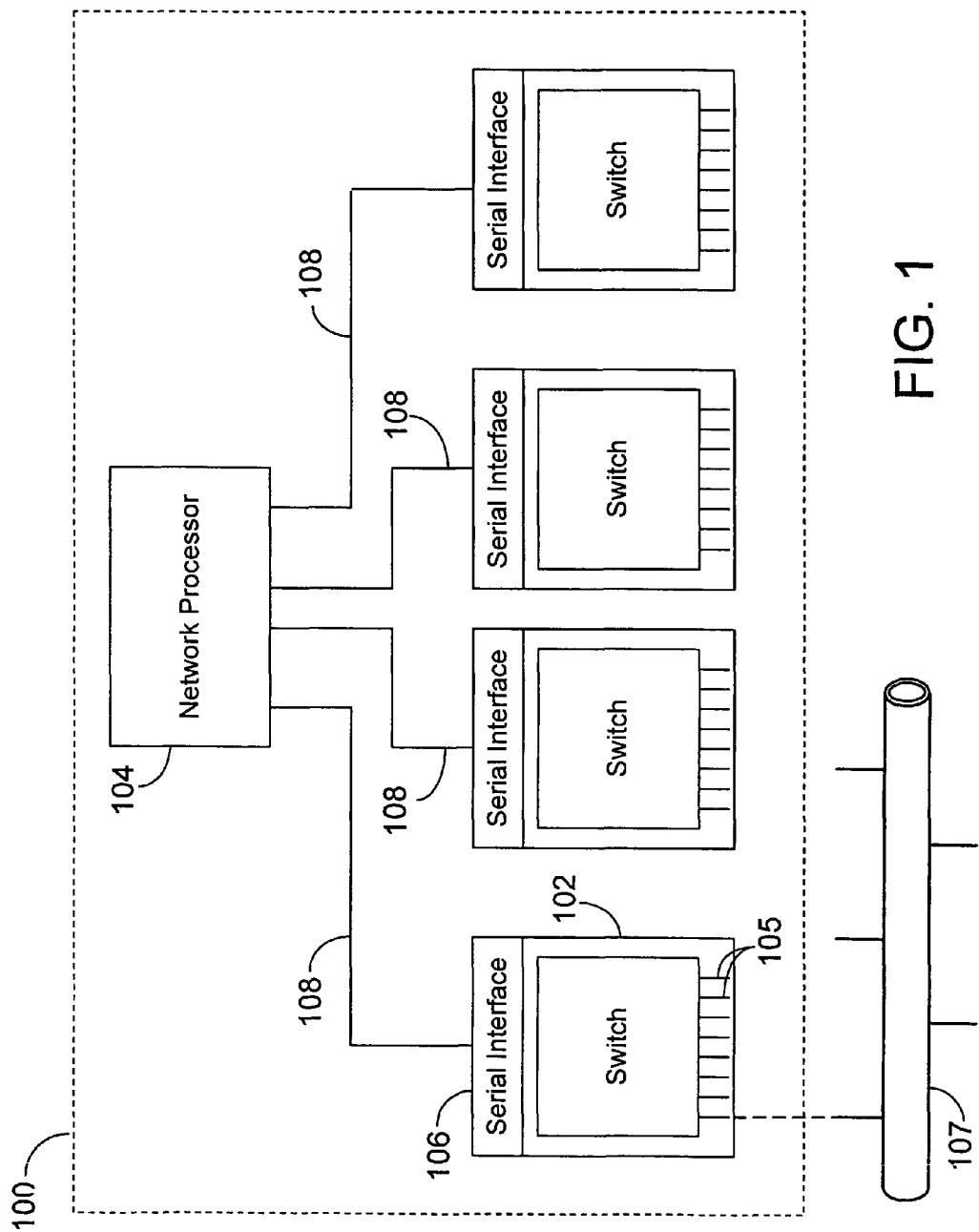
FIG. 1 is a block diagram of a network system according to an embodiment.

FIG. 1 shows a network system 100 according to an embodiment. The system may have an Ethernet Local Area Network (LAN) architecture, which complies with the IEEE 802.3 standard. The system may include a number of switches 102 connected to a network processor 104. The network processor 104 may manage the switches 102 and their ports by performing packet processing, manipulation, and scheduling of packet transmission queues, and may include a queue for each of the ports of the switches. The network processor 104 and the switches 102 may be contained in a single device or distributed across several connected devices. The switches may be connected to other network devices (e.g., switches, routers, endpoints, etc.) in a larger Ethernet LAN system 107 through their ports 105.

Each switch 102 may have multiple ports to be connected to the network processor 104. However, the network processor 104 may not have enough ports to directly connect to the ports of all switches 102. To accommodate for this pinout, and possibly throughput, limitation, ports in a switch may be connected to a single port in the network processor 104 through a high-speed serial interface 106, e.g., a 1 Gbps (1.25 Gbaud) SERDES (Serializer/Deserializer) interface. The network ports of the switch may have a lower maximum speed (e.g., 10/100 Mbps), in which case the single port can accommodate the throughput of ten network ports.

Figure 2:
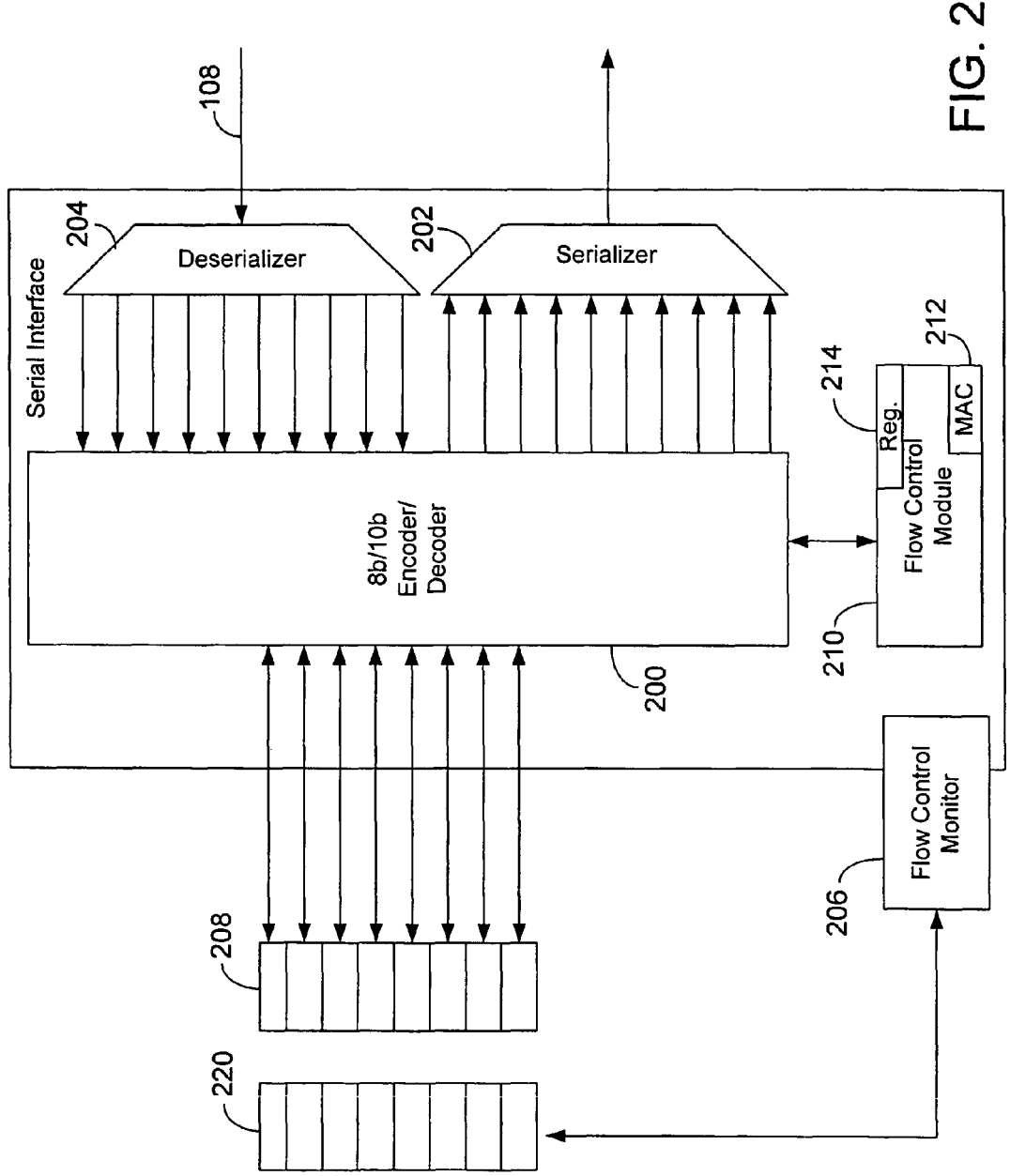
FIG. 2 is a block diagram of a serial interconnect including a flow control mechanism.

FIG. 2 shows an exemplary serial interface. The serial interface may have a SERDES configuration including an 8b/10b encoder/decoder 200 to convert 8 bit data from ports 208 in the switch to/from 10 bit symbols. A serializer 202 may serialize the 10 bit parallel symbols for transmission, and a deserializer 204 may deserialize serialized data from the 1 Gbps SERDES link. The serial interface 106 may be implemented in an ASIC (Application Specific Integrated Circuit) connected to the switch chip or incorporated into the switch chip. Alternatively, the serial interface may be replaced with a non-serial, wider interconnect inside the switch chip.

The network processor 104 may receive and transmit Ethernet frames to and from the switches 102 through the high-speed serial link 108. In an embodiment, the network processor 104 may perform the bulk of switching and/or routing for the system 100, which itself may function as a switch. The network processor 104 may also perform other higher level network management functions, e.g., traffic management, policy lookup, IP routing, MPLS (Multiprotocol Label Switching), service level negotiation, etc. The switches connected to the network processor 104 may be limited to physical (PHY) and media access control (MAC) layer functionality and be limited functionally to buffering frames in transit to and from the network processor 104.

Queuing for local ports may be handled by input and output buffers (e.g., a first-in-first-out (FIFO) buffer) connected to the switch's input and output ports, respectively. The buffers can store a limited number of packets at a time. When the port receives more packets than it can handle, an overflow situation may occur, and the port may be forced to drop received packets until the buffer empties to some degree. For example, a network port on the switch may have experience congestion on its transmit side when the rate of packets arriving at its buffer (to be transmitted) is higher than the rate at which it can transmit the packets on the port. This may occur when the link partner is requesting the switch port to stop sending frames using the 802.3x PAUSE frame (described below) and/or when the port speed is relatively low compared to the overall rate of frames arriving from other switch ports that are destined for this transmit port.

To reduce packet loss due to overflow at the port buffers, the serial interface 106 may employ a flow control mechanism. The local switch may monitor the fill threshold of its buffer at a port, and before having to drop packets, the switch may notify the network processor through the serial interface 106 that this port is experiencing congestion. In such an architecture, congestion management, namely the decision as to which frames need to be dropped, may be implemented by the network processor, which has concurrent visibility on the congestion status of the downstream transmit ports on the switches.

In an embodiment, the switch or serial interface 106 may include a flow control monitor 206 to monitor the status of the port buffers connected to other network devices in the Ethernet LAN 107. The serial interface may also include a flow control module 210 to implement the flow control mechanism. The flow control module 210 may implement the flow control mechanism for Ethernet LAN switches specified by the IEEE 802.3x standard.

The IEEE 802.3x flow control mechanism is implemented within the MAC (Media Access Control) sublayer. A port's input buffer begins to fill as packets are received. Once the buffer has reached a pre-programmed threshold, the MAC sublayer signals an internal state machine to transmit a "PAUSE" frame. The PAUSE frame informs the link partner to halt transmission for a specified length of time, referred to as "$X_{off}$". The MAC continues to transmit PAUSE frames with the programmed idle time as long as the threshold has been exceeded. If the buffer level falls below the threshold prior to the expiration of this time, another PAUSE frame is sent with a zero time specified to re-enable transmission, referred to as "$X_{on}$".

In an embodiment, flow control may be activated based on the output queue fill level of the port 105. When a packet is sent from the network processor 104 through the serial link 108 to the switch 102, congestion may occur on the output queues of the destination port on the switch device 102. Once the port's output queue reaches a pre-programmed threshold, the MAC sublayer of the serial interface 106 may signal an internal state machine to transmit a "PAUSE" frame. The PAUSE frame informs the network processor 104 to halt transmission for the congested port for a specified length of time, referred to as "$X_{off}$". The MAC continues to transmit PAUSE frames with the programmed idle time as long as the threshold has been exceeded. If the output queue buffer level falls below the threshold prior to the expiration of this time, another PAUSE frame is sent with a zero time specified to re-enable transmission, referred to as "$X_{on}$".

Figure 3:
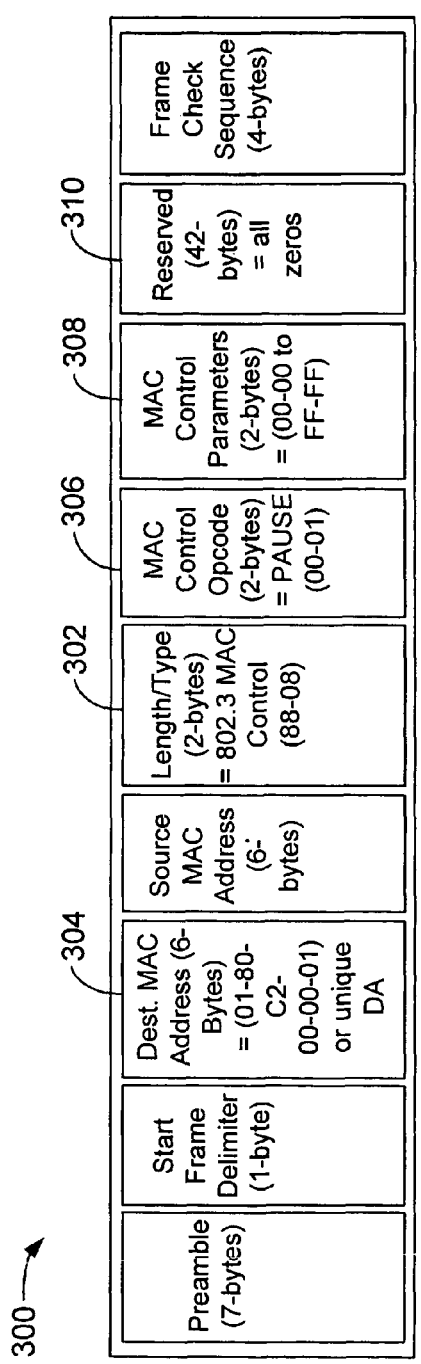
FIG. 3 shows an IEEE 802.3x PAUSE frame format.

FIG. 3 shows a PAUSE frame format 300. The format of a PAUSE frame conforms to the standard Ethernet frame format but includes a unique type field 302 and other parameters. The destination address 304 of the frame may be set to either the unique DA of the station to be paused, or to the globally assigned multicast address 01-80-02-00-00-01 (hex). This multicast address has been reserved by the IEEE 802.3 standard for use in MAC Control PAUSE frames. It is also reserved in the IEEE 802.1D bridging standard as an address that will not be forwarded by bridges. This ensures the frame will not propagate beyond the local link segment. The type field 302 of the PAUSE frame is set to 88-08 to indicate the frame is a MAC Control frame. The MAC Control opcode field 306 is set to 00-01 to indicate the type of MAC Control frame being used is a PAUSE frame. The MAC Control Parameters field 308 contains a 16-bit value that specifies the duration of the PAUSE event in units of 512-bit times. Valid values are 00-00 to FF-FF. If an additional PAUSE frame arrives before the current PAUSE time has expired, its parameter replaces the current PAUSE time, so a PAUSE frame with parameter zero allows traffic to resume immediately. This may occur when the device that issued the PAUSE frame empties its buffer before the stated pause time has elapsed. A 42-byte reserved field 310 (transmitted as all zeros) is required to pad the length of the PAUSE frame to the minimum Ethernet frame size.

In many network systems, the network devices (e.g., switches, routers, endpoints, and network processors) may only have information regarding the status of their own ports, and not that of other network devices in the system, e.g., their link partners. Flow control mechanisms may only provide the status of the particular link connecting two link partners and no more information about the capacity of the link partner. For example, an IEEE 802.3x PAUSE frame typically only communicates point-to-point flow control information, i.e., the status of the individual link on which the PAUSE frame is transmitted. Also, the information provided by the flow control status may be limited to simple binary information, e.g., on/off or "send"/"don't send".

In an embodiment, the switches may provide the status of multiple ports to another network device. For example, in the system 100, the switches may provide the flow control status of their output ports to the network processor, which may use that information to make decisions regarding traffic management. For example, the network processor may include virtual buffers corresponding to the output ports of the switches 102. The network processor may use the per port status information received from a switch to determine whether to send a frame to a particular port in that switch or queue that frame in the virtual port corresponding to that port and instead send a frame to another, more available port, thereby avoiding head-of-line blocking situations. In addition, decisions to drop packets may be allocated to the network processor, which may have more sophisticated algorithms for handling packet overflow conditions.

Figure 4:
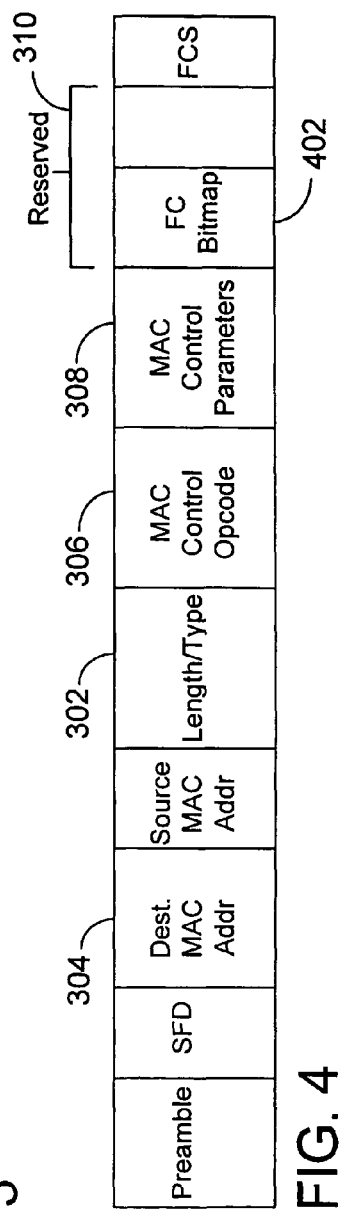
FIG. 4 shows a PAUSE frame format including per-port flow control status information.

In an embodiment, the system 100 may utilize the IEEE 802.3x flow control mechanism to communication per port flow control information from the switches to the network processor. The flow control module 212 in the serial interface 210 may include a MAC module 212 to handle MAC sublayer functions. The flow control module 212 may insert flow control status information for each port into the PAUSE frame, e.g., by generating a bitmap identifying the flow control status of each port. The flow control module may insert the bitmap 402 into PAUSE frame, e.g., in the 42 byte reserved field, as shown in FIG. 4. Because the reserved field of the 802.3x PAUSE frame is usually ignored by a network device, IEEE 802.3x-compliant network devices that receive a PAUSE frame with the per port flow control status bitmap will not be adversely affected by receiving such a PAUSE frame.

Figure 5:
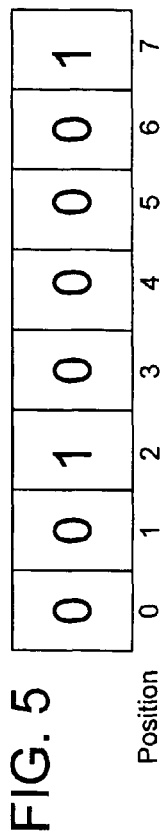
FIG. 5 is a bitmap including bits representing the flow control status of port in a switch device.

In an embodiment, the bitmap may be an 8-bit field, with each bit representing the flow control status of a port, as shown in FIG. 5. For example, a "zero" in a particular bit location (e.g., bit position 2 500) may indicate that the corresponding port buffer is below the flow control threshold, whereas a "one" may indicate that the port has exceeded the flow control threshold. The bit map may dedicate more bits to each port to convey additional information, such as port speed transitions (e.g., from 100 Mbps to 10 MBps) or whether the port empties its buffer before the stated pause time has elapsed. The network processor 104 may use this information to determine whether to send additional frames to the particular port. Any decisions as to forwarding, queuing, or dropping packets may then be made at the network processor. As discussed above, this may be advantageous as the network processor may employ more sophisticated packet handling mechanisms.

Figure 6:
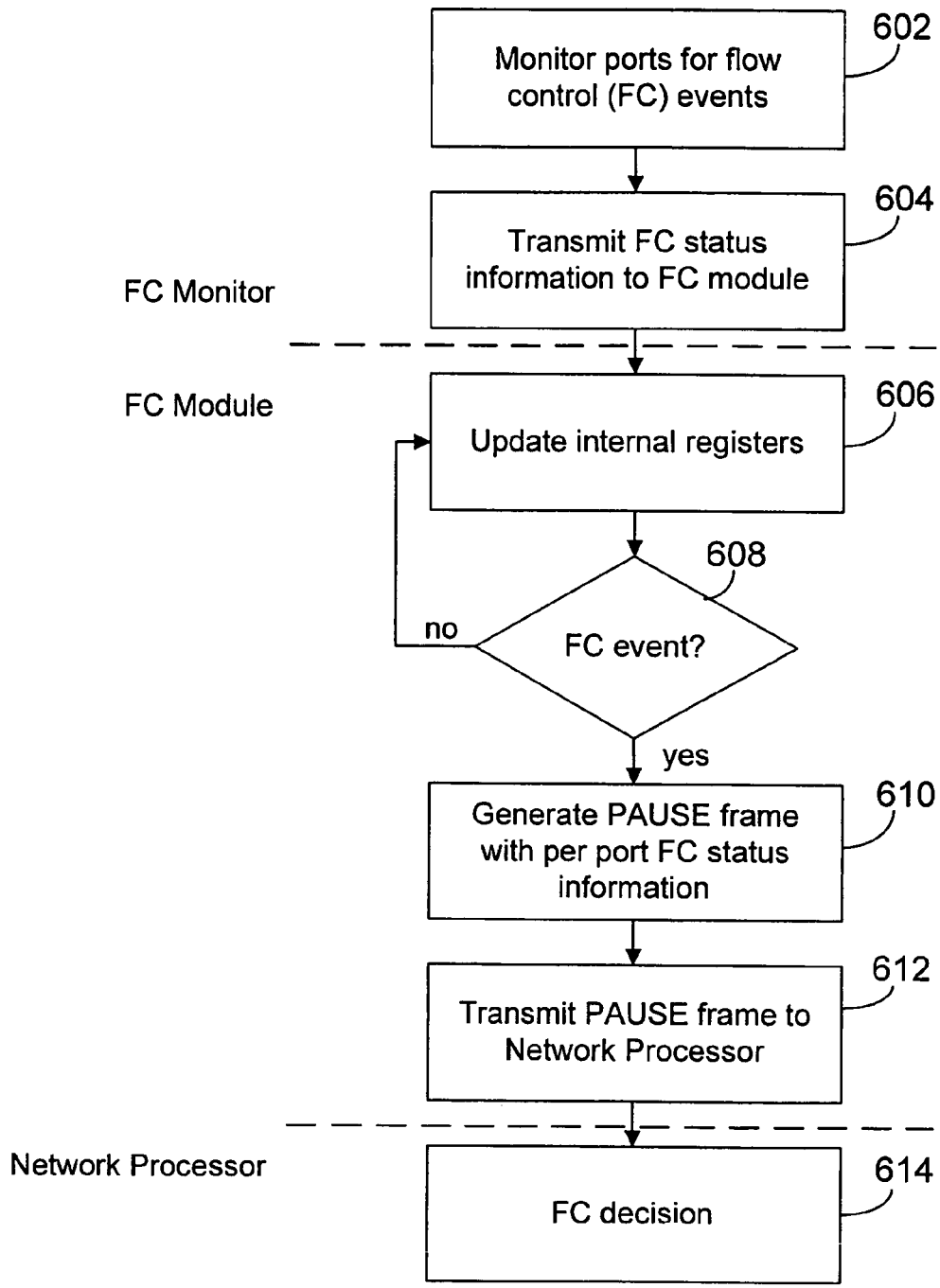
FIG. 6 is a flowchart describing a flow control operation according to an embodiment.

FIG. 6 is a flowchart describing a flow control operation 600 according to an embodiment. The flow control monitor 206 in a switch may monitor the output port buffers 208 of the switch 102 for flow control events, e.g., a port passing the buffer threshold, a port under flow control emptying its buffers, or a port speed transition (block 602). The flow control monitor 206 may transmit the flow control status of the ports to the flow control module 210 monitor periodically or upon the occurrence of a flow control event (block 604).

The flow control module 210 may update its internal registers 214 with the flow control status information received from the flow control monitor 206 (block 606). In an embodiment, the flow control monitor 206 and flow control module 210 may be integrated into a single module. When a flow control event occurs (block 608), the flow control module 210 may generate a PAUSE frame including a bitmap indicating the per-port flow control status of the ports (block 610). The serial interface may then transmit the PAUSE frame to the network processor 104 over the high-speed serial link (block 612).

In an alternative embodiment, the serial interface may transmit the per-port flow control status information on a continuous basis. For example, the flow control module may insert a bitmap including per-port flow control status into the preamble of each frame transmitted by the serial interface to the network processor.

The network processor may extract the bitmap from the designated location in a frame (e.g., preamble and reserve section) and use this information to determine whether to throttle the transmission of frames to particular port(s) (block 614).

A number of embodiments have been described. Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

The invention claimed is:

1. A method comprising:
monitoring a flow control status of each of a plurality of ports;
generating a PAUSE frame having a RESERVED field including an indicator identifying the flow control status of one or more ports in response to a flow control event occurring at the one or more ports; and
managing, using a network processor configured to make one or more network traffic-related decisions including determining locally at the network processor whether data is to be halted or transmitted to the plurality of ports based on the frame, a flow control associated with the one or more ports based on the indicator including halting data transmission by the network processor to at least one designated port based on the one or more network traffic-related decisions.

2. The method of claim 1, wherein the flow control event comprises reaching a flow control threshold locally at the one or more ports.

3. The method of claim 1, further comprising transmitting the indicator from the one or more ports to a link partner.

4. The method of claim 1, wherein said generating the indicator comprises generating a bitmap including data identifying the flow control status of the one or more ports.

5. The method of claim 1, wherein said monitoring comprises monitoring a plurality of output buffers associated with one or more ports.

6. An apparatus comprising:
a plurality of ports;
a plurality of buffers in communication with the plurality of ports;
a flow control monitor to monitor a flow control status of one or more buffers;
a flow control module to generate an indicator for transmission over one of said plurality of ports in response to the flow control monitor detecting a flow control event at the one or more buffers, the indicator identifying the flow control status of the one or more buffers;
a frame generator to generate a PAUSE frame having a RESERVED field including the indicator; and
a network processor to make one or more network traffic-related decisions including determining locally at the network processor whether data is to be halted or transmitted to the plurality of ports based on the frame, and to manage a flow control of the one or more buffers based on the one or more network traffic-related decisions in response to the flow control event.

7. The apparatus of claim 6, wherein the frame generator comprises a MAC (Media Access Control) module.

8. The apparatus of claim 6, wherein the indicator comprises a bitmap.

9. The apparatus of claim 6, wherein the flow control event includes a buffer reaching a flow control threshold.

10. The apparatus of claim 6, wherein said one of the plurality of ports is adapted to be connected to a link to the network processor.

11. The apparatus of claim 10, wherein the link comprises a serial link in communication with a plurality of said ports.

12. The apparatus of claim 6, wherein the apparatus comprises a switch.

13. The apparatus of claim 6, wherein the one or more buffers comprise output buffers in communication with the plurality of ports.

14. An apparatus comprising:
a plurality of ports;
a plurality of buffers in communication with the plurality of ports;
means for monitoring a flow control status of one or more buffers;
means for generating a PAUSE frame having a RESERVED field including an indicator for transmission over one of said plurality of ports in response to the means for monitoring detecting a flow control event at the one or more buffers, the indicator identifying the flow control status of the one or more buffers; and
means for managing a flow control of the one or more buffers based on one or more network traffic-related decisions determined locally at the network processor by the means for managing in response to the flow control event including halting data transmission to the plurality of ports based on the one or more network traffic-related decisions.

15. The apparatus of claim 14, wherein the means for generating the frame comprises MAC (Media Access Control) control means.

16. The apparatus of claim 14, wherein the indicator comprises a bitmap.

17. The apparatus of claim 14, wherein the flow control event includes a buffer reaching a flow control threshold.

18. The apparatus of claim 14, wherein said one of the plurality of ports is adapted to be connected to a link to the means for managing.

19. The apparatus of claim 18, wherein the link comprises a serial link in communication with a plurality of said ports.

20. The apparatus of claim 14, wherein the apparatus comprises a switch.

21. The apparatus of claim 14, wherein the one or more buffers comprise output buffers in communication with the plurality of ports.

22. A system comprising:
a network processor; and
a switch including:
a plurality of ports in communication with the network processor;
a plurality of buffers in communication with the plurality of ports;
a flow control monitor to monitor a flow control status of one or more buffers; and
a flow control module to generate an indicator for transmission to the network processor in response to the flow control monitor detecting a flow control event at the one or more buffers, the indicator identifying the flow control status of the one or more buffers; and
a frame generator to generate a PAUSE frame having a RESERVED field including the indicator,
wherein the network processor is configured to make one or more network traffic-related decisions including determining locally at the network processor whether data is to be halted or transmitted to the plurality of ports based on the frame, and to manage a flow control of the one or more buffers based on the one or more network traffic-related decisions in response to the flow control event.

23. The system of claim 22, wherein the frame generator comprises a MAC (Media Access Control) module.

24. The system of claim 22, wherein the indicator comprises a bitmap.

25. The system of claim 22, wherein the flow control event includes a buffer reaching a flow control threshold.

26. The system of claim 22, wherein said one of the plurality of ports is adapted to be connected to a link to the network processor.

27. The system of claim 26, wherein the link comprises a serial link in communication with a plurality of said ports.

28. The system of claim 22, wherein the one or more buffers comprise output buffers in communication with the plurality of ports.

29. A system comprising:
a network processor; and
a switch including:
a plurality of ports in communication with the network processor;
a plurality of buffers in communication with the plurality of ports;
means for monitoring a flow control status of one or more buffers; and
means for generating a PAUSE frame having a RESERVED field including an indicator for transmission to the network processor in response to the means for monitoring detecting a flow control event at the one or more buffers, the indicator identifying the flow control status of the one or more buffers,
wherein the network processor is configured to make one or more network traffic-related decisions including determining locally at the network processor whether data is to be halted or transmitted to the plurality of ports based on the frame, and to manage a flow control of the one or more buffers based on the one or more network traffic-related decisions in response to the flow control event.

30. The system of claim 29, wherein the means for generating the frame comprises MAC (Media Access Control) control means.

31. The system of claim 29, wherein the indicator comprises a bitmap.

32. The system of claim 29, wherein the flow control event includes a buffer reaching a flow control threshold.

33. The system of claim 29, wherein said one of the plurality of ports is adapted to be connected to a link to the network processor.

34. The system of claim 33, wherein the link comprises a serial link in communication with a plurality of said ports.

35. The system of claim 29, wherein the one or more buffers comprise output buffers in communication with the plurality of ports.

36. An apparatus comprising:
a switch having a plurality of ports, the switch is configured to generate a flow control frame and transmit the flow control frame to a network processor configured to make one or more network traffic-related decisions including determining locally at the network processor whether data is to be halted or transmitted to the plurality of ports based on the flow control frame, the flow control frame having a field including an indicator identifying a flow control status of one or more ports,
wherein the switch generates the flow control frame in response to a flow control event occurring at one or more ports; and
wherein the flow control frame is a PAUSE frame and wherein the field is a RESERVED field.

37. The apparatus of claim 36, wherein the field comprises a preamble.

38. The apparatus of claim 36, wherein the indicator comprises a bitmap including a plurality of bits.

39. The apparatus of claim 36, wherein one or more of the plurality of bits indicate a flow control status of a corresponding one of the plurality of ports.

40. The apparatus of claim 36, wherein the flow control event includes a buffer connected to a port reaching a flow control threshold.

41. The method of claim 1, where generating an indicator includes generating the indicator locally at the one or more ports.

42. The apparatus of claim 6, wherein the flow control module generates the indicator locally at the one or more buffers.

43. The method of claim 1, further comprising:
generating a second frame including a second indicator requesting the processor to re-enable data transmission when one or more transmission criteria have been met.

44. The method of claim 43, where generating a second frame includes generating a second PAUSE frame.

45. The method of claim 43, where halting data transmission includes halting the data transmission for a predetermine period; and
where generating a second frame includes generating the second frame before the predetermined period expires and if the at least one designated port is available.

46. The method of claim 1, where managing the flow control includes:

receiving a second frame at the network processor, the second frame including a halt transmission indicator related to the flow control event associated with the one or more ports and indicating the data transmission from the network processor is halted to the one or more ports.

47. A method comprising:

monitoring a flow control status of each of a plurality of ports;

generating a first PAUSE frame having a RESERVED field including an indicator identifying the flow control status of the plurality of ports in response to a flow control event occurring at one of the plurality of ports;

transmitting the first PAUSE frame to a network processor to halt data transmission to the one of the plurality of ports for a predetermined length of time, the network processor configured to make one or more network traffic-related decisions including determining locally at the network processor whether data is to be halted or transmitted to the one of the plurality of ports based on the first frame;

determining if a threshold associated with the one of the plurality of ports has been met prior to the predetermined length of time; and if it is determined that the threshold has been met:
generating a second PAUSE frame having a RESERVED field including an indicator that includes the flow control status of the plurality of ports; and
transmitting the second PAUSE frame to the network processor to re-enable data transmission.

48. The method of claim 47, further comprising:
generating one or more additional first frames; and
transmitting the one or more additional first frames to the network processor to halt data transmission during the predetermined length of time until the threshold has been met.

49. The method of claim 47, where generating the second frame includes generating the second frame specifying a zero time to re-enable data transmission upon determining the threshold has been met.

50. The method of claim 1, where managing the flow control associated with the one or more ports based on the indicator includes determining whether data is to be dropped from transmission, queued in a queue associated with a respective port, or forwarded to the at least one designated port.

51. The apparatus of claim 6, where the network processor is configured to perform one or more network management functions including at least one of traffic management, routing policy lookup, internet protocol routing, multiprotocol label switching, and service level negotiation.

* * * * *